Dec. 3, 1940.    H. W. SLAUSON    2,223,428
NAVIGATION INSTRUMENT
Filed March 31, 1938    2 Sheets-Sheet 1
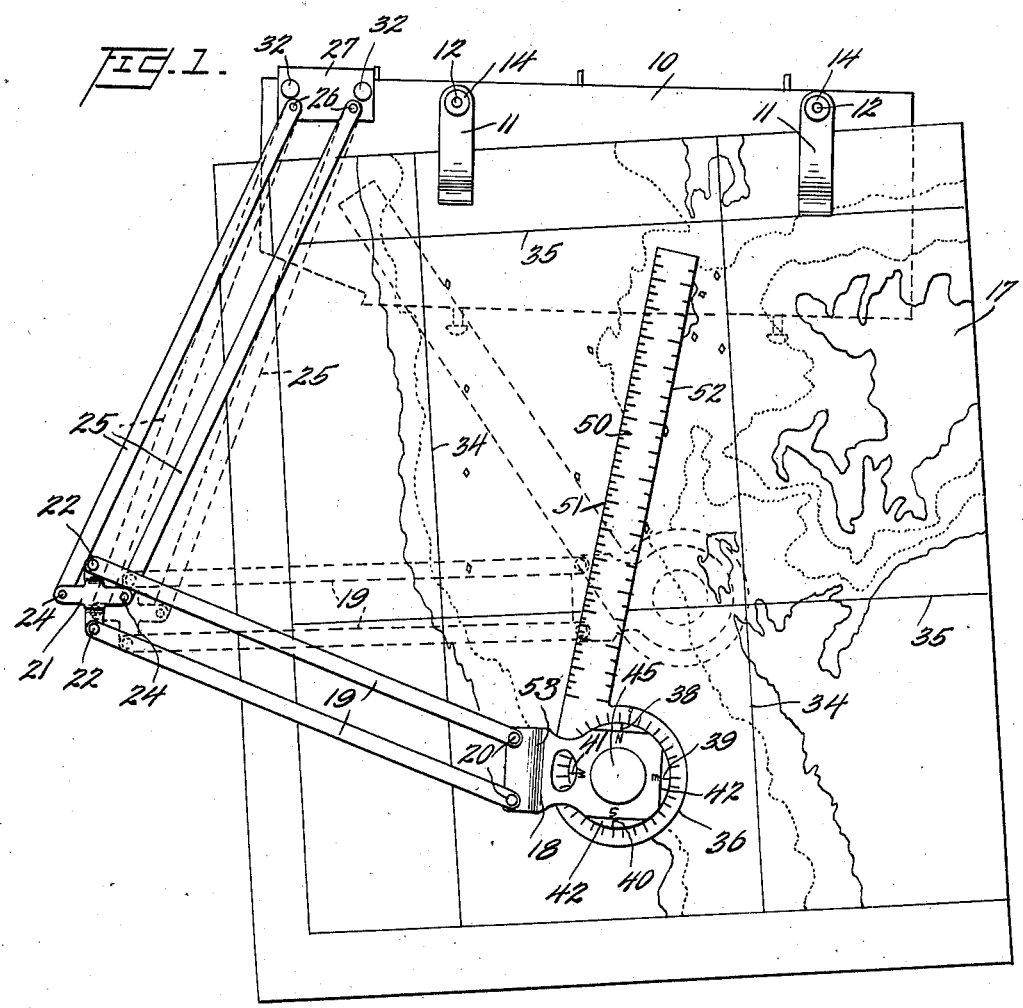
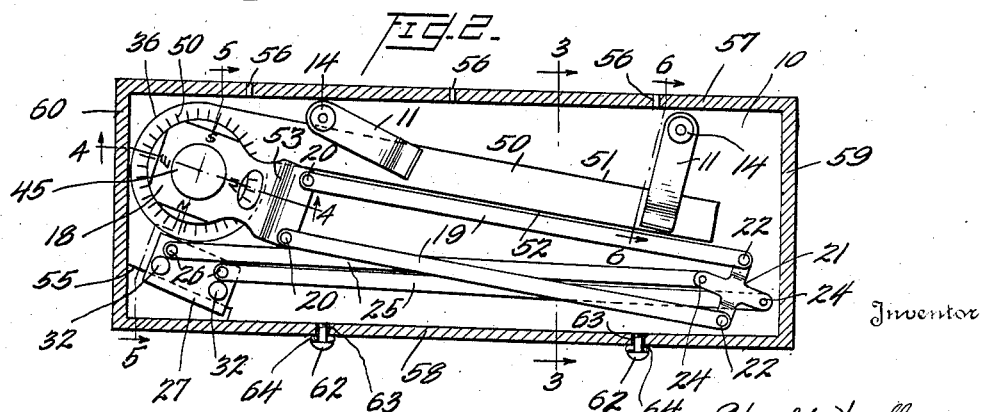
Inventor
Harold W. Slauson
By Watson, Cole, Grindle & Watson
Attorney Dec. 3, 1940.    H. W. SLAUSON    2,223,428
NAVIGATION INSTRUMENT
Filed March 31, 1938    2 Sheets-Sheet 2
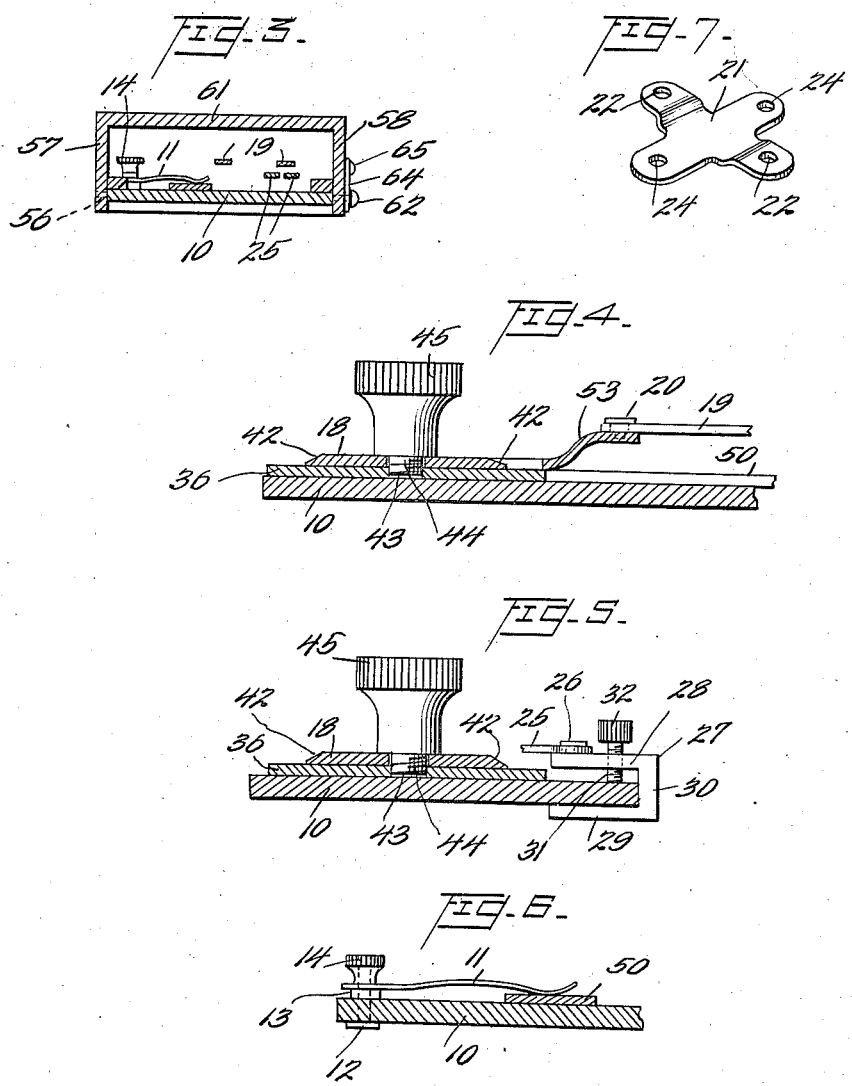

Patented Dec. 3, 1940

2,223,428

UNITED STATES PATENT OFFICE 2,223,428

NAVIGATION INSTRUMENT

Harold W. Slauson, Scarsdale, N. Y.

Application March 31, 1938, Serial No. 199,223

1 Claim. (Cl. 33—79)

This invention relates to navigation instruments and particularly to plotting and charting devices for laying and determining courses from hydrographic or other charts and maps.

It is the general object of the present invention to provide an improved device for the above mentioned purposes which does not require reference to the compass rose on the chart so that large charts can be used in a folded condition for convenience in crowded quarters.

An important object of the invention consists in the provision of a device including a small base having means for attaching a chart securely thereto and carrying an instrument including a scaled rule which may be moved anywhere on the face of the chart while always remaining parallel to its initially set position, and which is adjustable in respect to a protractor-like scale for determining course angles in respect to the true or the magnetic meridian.

Another important object of the invention is to provide an instrument and mounting board containing clamps for charts or the like, the whole of which can be folded into extremely small compass, the clamps holding the instrument on the base which forms the base of a carrying case or cover.

An important feature of the invention resides in the provision of mechanism for carrying the protractor and scale which imparts a parallel motion thereto and which itself is adapted to be clamped to the edge of a drawing board, chart table or the like, together with a small base or board having clamps thereon for securing a chart in position in the proper relationship to the instrument and which has a special point of application for the instrument whereby the whole can be folded into the small compass of the board, retained by the chart clamps and readily housed in a convenient carrying case.

Other and further features and objects of the invention will be more apparent to those skilled in the art upon a consideration of the accompanying drawings and following specification, wherein is disclosed a single exemplary embodiment thereof with the understanding that such changes may be made therein as fall within the scope of the appended claim without departing from the spirit of the invention.

In said drawings:

Figure 1 is a plan view of the apparatus of the present invention shown with a chart mounted thereon for the purpose of determining the course of a vessel in the waters depicted on the chart;

Figure 2 is a plan view of the instrument folded on its baseboard and housed within the carrying case which is shown in horizontal section;

Figure 3 is a transverse section on line 3—3 of Figure 2 showing the manner of securing the base in the box;

Figure 4 is a fragmentary section on an enlarged scale through the protractor head taken on line 4—4 of Figure 2;

Figure 5 is a view similar to Figure 4 taken at right angles thereto on line 5—5 of Figure 2 showing the instrument clamp in elevation;

Figure 6 is a section on line 6—6 of Figure 2 showing one of the chart clamps in elevation; and Figure 7 is a perspective view of the cruciform connector for the sets of parallel arms.

The present invention while heretofore referred to as a device for use in navigating ships, boats or the like, is nevertheless equally as applicable to the similar practices in aviation. Most airplanes as well as the majority of small boats suffer from a lack of space for using charts. The time-honored method of determining the angle of or laying out a course in respect to the true or magnetic meridian has been to place a parallel ruler or a protractor combination on the course and move the same across the chart to the compass rose printed in one corner thereof and on this rose read off the angle.

The customary form of parallel ruler comprising a pair of blade-like members connected by parallel pivoted arms is operated in an awkward manner by holding one blade on the chart and stepping the other, then holding the second and bringing up the first, and errors existing in the instrument are thus cumulative. In addition there is always the possibility of slippage which if detected requires the procedure to be repeated and if undetected, results in serious error which may be disastrous. The rolling form of parallel ruler and the protractor combination are likewise subject to the difficulties of slippage and require an extremely smooth flat surface for their operation. Other forms of apparatus which are not so well known or so universally used are subject to the same difficulties, the principal one of which, except for the erroneous operation referred to above, is the requisite for a space sufficiently large to open out the chart so that the course can be referred to the compass rose. Most charts are of large size, approximately 30" by 40" and sufficient space is not always available for this purpose except on boats and planes provided with a separate chart room or table. Moreover the use of a parallel ruler or the ordinary protractor requires two hands so that the skipper cannot handle the boat while charting his course even if he has sufficient space to lay out a chart near the wheel or tiller.

In accordance with the present invention the charts can be used folded, showing on the exposed face only that portion of the same over which the course is to be determined. This results from features of the device making it unnecessary to refer all courses back to the compass rose. The apparatus can be used with one hand and requires only a small space.

Where magnetic courses are used the compass variation must be known, and this is marked on the rose or is available from nautical almanacs. It need be made use of but once in setting the chart as will be subsequently described. Likewise compass deviation can be compensated for when the amount is known.

Referring now to the drawings, and particularly to Figures 1 and 2, there is shown a small substantially rectangular baseboard 10 that is longer than wide and that is not nearly so large as even the folded size of a chart. Its size is merely sufficient to receive the instrument completely folded thereon as shown in Figure 2. It may be made of suitable ply board, plastic composition, or the like, is preferably substantially rectangular and carries attached along its upper edge a pair of spring clips 11 of the general configuration shown in Figure 6 each mounted on the shank of a screw 12 extending through the base, resting on a nut 13 thereon and adapted to be clamped in position by a thumb nut 14. The bowing of each clamp is such that when the thumb nut is tightened down the curved tip 15 presses tightly against the board so as to hold in position a chart which may have been slipped beneath the clamps before the nuts are tightened if desired. The chart folded to about one sixth of its full size is shown at 17 in Figure 1.

The remainder of the apparatus comprises a substantially universal parallel motion mechanism including the head 18 carried by the parallel arms 19 attached thereto at pivot points 20; the cruciform member 21 carrying the pivots 22 for the opposite ends of the arms 19 spaced apart the same distance as the pivots 20. On an axis at right angles to that passing through the pivots 22 and below the same are mounted the pivots 24 for one end of a pair of parallel arms 25, extending to the pivots 26 with the same spacing as the pivots 24 on the clamp member 27, best seen in Figure 5 as comprising a U-shaped device having the top arm 28, the bottom arm 29 and the connecting member 30. The bottom arm is received against the underside of the baseboard 10, the member 30 against its edge, while the upper arm 28 extends over the upper surface of the base and carries a pair of clamp screws 31 adapted to be manipulated by the knurled heads 32 to secure the clamp firmly to the base in any desired position along its edges.

The parallel motion mechanism just described permits the head 18 to be moved over a definite area of chart always parallel to its initial position, thereby offering means for determining the angularity of a course on the chart in respect to the true meridian as indicated by any of the longitude lines 34 on the chart or for that matter to the latitude lines or parallels 35.

To permit this the head 18 has pivotally secured beneath it the graduated disc or protractor 36 that simulates the compass rose on the chart, except that the graduations on this disc are preferably arranged counterclockwise from zero to 360° and cooperate with index marks 38, 39, 40 and 41 arranged on inclined surfaces 42 on the head. These index marks correspond respectively with indicia representing the cardinal compass points north, east, south and west.

The pivoting of the disc 36 to the head 18 is accomplished by the stud 43 closely fitting a bore in the head and threaded as at 44 into the disc 36. A large knurled head 45 on this stud provides a convenient operating handle for moving the instrument over the surface of the chart and at the same time permits locking of the disc at the desired angle in respect to the head.

The disc carries preferably integral therewith the ruler or scale 50, the upper marking edge 51 of which is parallel to the zero–180° diameter of the graduated disc.

This edge, as well as the opposite edge 52, may conveniently be graduated to any suitable scale to replace the usual dividers resorted to for transferring distances to a scale. It may have the usual inch marks with suitable intermediate graduations, or it may have engraved thereon a scale of miles either nautical or statute, preferably in one or more of the ratios used on most charts, for instance 1 to 80,000.

The construction of the apparatus is such that the scale 50 has its upper edge preferably tangential to the periphery of the attached protractor portion. Because of the vertical offset 53 in the head 18, the arms 19 may move above the scale and it is permitted to rotate through a full 360° without interference with any of the parts of the mechanism carrying the same.

Because of the mounting of the protractor-ruler it may be used in a reversed position. The under face of the disc may be graduated in compass "points" to satisfy those desiring to work with them and other scales may be applied to the edges of the ruler if desired.

The arms carrying the pivots 22 on the cruciform member 21 are offset upwardly as shown in Figure 7 to permit the parallel links 19 to move above the parallel links 25 when necessary so that there is no interference between the same. This arrangement of parts permits the apparatus to be folded into a compact assembly as shown in Figure 2 with the scale substantially parallel to the arms 19 and with them overlapping the arms 25. In order that the clamp 27 may be attached to the baseboard 10 when the apparatus is folded for packing, one corner of the baseboard is clipped at the angle shown at 55 which accommodates the clamp 27 when the apparatus is compacted. The clipped portion 55 is longer than the length of the clamp 27, as can be seen in Fig. 2, and is designed so that when in the folded position shown in Fig. 2, the clamp 27 lies wholly within the rectangular contour lines of the base 10. If the clamp were put on the straight edge of the baseboard as shown in Figure 1, the apparatus could not be arranged within the compass of so small a base. With the arrangement shown in Figure 2 the chart clamps 11 can be secured over the scale 50 to hold the same in position and prevent the parts of the apparatus from moving on the base.

The edge of the base opposite that on which the clamp 27 is applied for packing the instrument has extending therefrom several metal pins or dowels 56 which, as seen in Figure 3, are adapted to be received longitudinally in holes in the side member 57 of a box of just sufficient size to slip around the edges of the base member. The sides 57 and 58 as well as end members 59 and 60 are secured about a bottom member 61 in any suitable manner, the depth of the box being just adequate to receive the apparatus when the base is set in as shown in Figure 3 to house the bottom of the clamp within the plane of the bottom edges of the box.

On the opposite edge of the base 10 are the screws 62 the exposed shanks of which are received in slots 63 in the side 58 of the box with the heads substantially flush with the surface thereof but extending sufficiently far to permit the hooks 64 pivoted at 65 to be swung over the shanks to hold the base in position within the box. The assembly of base, instrument and box is exceedingly compact, occupying but small space and if desired can be equipped with a carrying handle. The box fully protects the instrument and since the base forms the cover of the box there are but two parts when it is removed therefrom. The base takes the place of a chart table or board in spite of its small size so that the apparatus can be used in various places about a small boat or plane and actuated with one hand to rapidly accomplish what required a large table or chart board, two hands, considerable time and some degree of skill with the old equipment.

To use the apparatus the base is removed from the box, the clamp removed from 55 and applied as in Figure 1, and a chart, folded to suitable size to expose only the portion required for the course to be plotted or whose angle is to be determined, is suitably arranged beneath the clamps 11 which are tightened down just sufficiently to hold the chart in position but to permit it to be moved. The protractor is then set in respect to the N index to show the exact degree of compass variation and if desired the deviation, the two being added algebraically. With this setting clamped by means of the knurled nut 45 the scale is brought adjacent one of the lines of longitude 34 and the chart twisted beneath its clamps until this line is parallel to the edge of the scale. The clamps 11 are then tightened down to insure against slippage of the chart in respect to the base.

After this initial setting any course line may be plotted, or the angle of one already plotted determined by merely laying either edge of the scale 50 along the line and reading the protractor. The reading of the protractor will then give the compass course to sail if the compass deviation has been added to the variation determined from the compass rose or the nautical almanac.

If it is desired to sail true course rather than magnetic the initial positioning of the chart is effected with the protractor set to zero.

It will be seen that with the above instrument the direction of a course can be read off instantly at the protractor without any reference whatsoever to the compass rose which may be on the far corner of the chart from the course being plotted. Moreover, the arrangement for initially setting the chart with respect to the base eliminates the need for making corrections for variation and deviation and thus the possibility of several serious errors.

Having thus described the invention, what is claimed as new and desired to be secured by Letters Patent is:

A navigation instrument including in combination, a substantially rectangular base longer than wide for supporting a nautical chart, chart holding clamps extending from the upper edge thereof, a ruler terminating in an enlargement bearing a compass rose, a squared plate marked with the cardinal points of the compass, clamping means for adjustably securing the compass rose beneath the squared plate, a clamping member substantially U-shaped in cross-section adapted to receive adjustably the edge of the base within the U, mechanism of parallel link type for supporting the plate and its ruler from the U-shaped clamping member; said base being smaller than a standard nautical chart and at its lower edge having a corner cut away at an angle for a distance longer than the clamping member for receiving said clamping member in a position so that the clamping member is wholly inset within the rectangular contour lines of the base whereby when the clamping member is so disposed, its link mechanism and ruler are foldable wholly within the contour outline of the base and clampable in such position by said chart holding clamps.

HAROLD W. SLAUSON.